United States Patent [19]
Gotterbauer

[11] Patent Number: 5,837,186
[45] Date of Patent: Nov. 17, 1998

[54] PROCESS OF AND AN APPARATUS FOR INJECTION MOLDING HOLLOW-BLOWN PLASTIC BODIES

[75] Inventor: Klaus Gotterbauer, Vilsheim, Germany

[73] Assignee: Eldra Kunststofftechnik GmbH, Germany

[21] Appl. No.: 651,649

[22] Filed: May 22, 1996

[30] Foreign Application Priority Data

May 23, 1995 [DE] Germany ................ 195 18 964.7

[51] Int. Cl.⁶ .............................................. B29C 45/00
[52] U.S. Cl. .................................................. 264/572
[58] Field of Search ........................... 264/572; 425/130

[56] References Cited

U.S. PATENT DOCUMENTS

| | | | |
|---|---|---|---|
| 3,873,656 | 3/1975 | Garner | 264/55 |
| 5,069,858 | 12/1991 | Hendry | 264/572 |
| 5,204,050 | 4/1993 | Loren | 264/572 |
| 5,423,667 | 6/1995 | Jaroschek | 264/572 |
| 5,607,640 | 3/1997 | Hendry | 264/572 |
| 5,612,067 | 3/1997 | Kurihara et al. | 264/572 |

FOREIGN PATENT DOCUMENTS

| | | |
|---|---|---|
| 2115488 | 11/1971 | France . |
| 3913109 | 10/1990 | Germany . |
| 42 35 673 A 1 | 4/1993 | Germany . |
| 43 00 397 A 1 | 7/1993 | Germany . |
| 42 37 062 C 1 | 2/1994 | Germany . |
| 42 30 782 A 1 | 3/1994 | Germany . |
| 39 13 109.2 | 11/1995 | Germany . |
| WO 94/08773 | 4/1994 | WIPO . |

OTHER PUBLICATIONS

Eyerer, et al, "Spritzgießen mit Gasinnendruck", Kunststoffe, 83, (Jul. 1993), pp. 505–517.

"Spritzgießen mit Gasinnendruck," P. Eyerer, R. Märtins, Stuttgart and E. Bürkle, in the journal Kunststoffe, Carl Hansa Verlag, Munich 1993.

*Primary Examiner*—Catherine Timm
*Attorney, Agent, or Firm*—Fitch, Even, Tabin & Flannery

[57] ABSTRACT

The invention relates to a process of and an apparatus for injection molding hollow-blown plastic bodies in which a mold cavity formed by a tool and consisting of at least one main mold cavity and one side mold cavity is filled with a pressurized flowable plastic melt and, after the setting in of the hardening of the plastic melt at the walls of the mold cavity, a pressurized fluid is introduced into the main mold cavity, and, with this, the flowable core of the plastic melt is forced out of this main mold cavity, and subsequently, a pressurized fluid is introduced into the side mold cavity by means of which the flowable core of the plastic melt is forced out of the side mold cavity into the main mold cavity, where the material still capable of flowing is deposited on the already hardened walls in the main mold cavity.

7 Claims, 2 Drawing Sheets

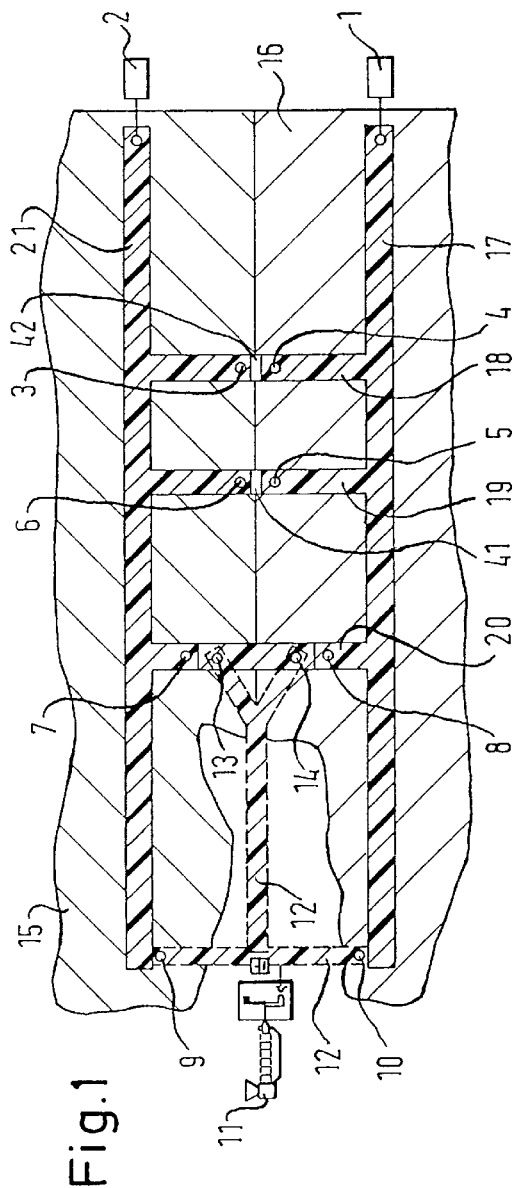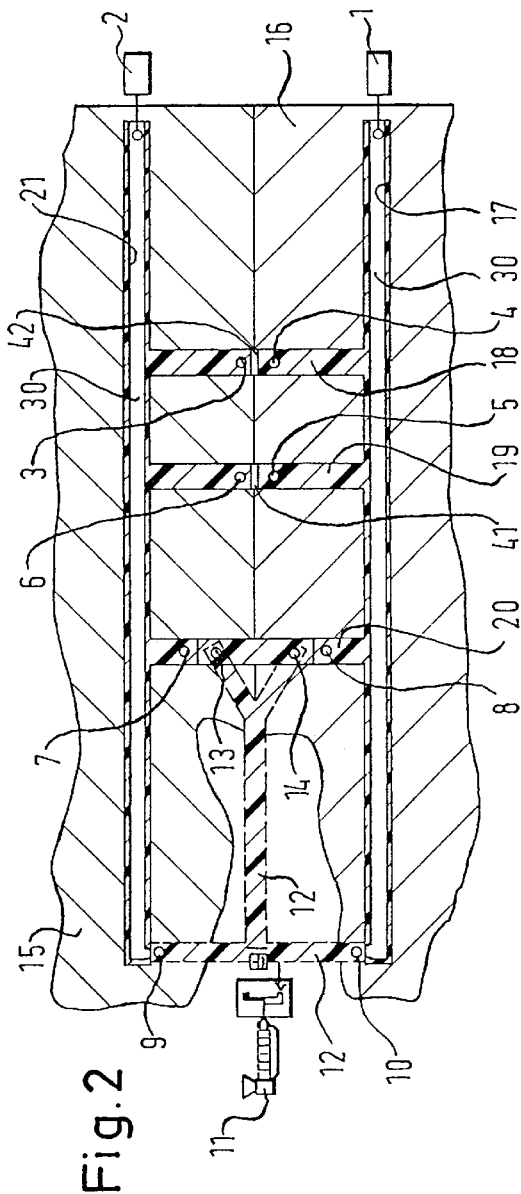

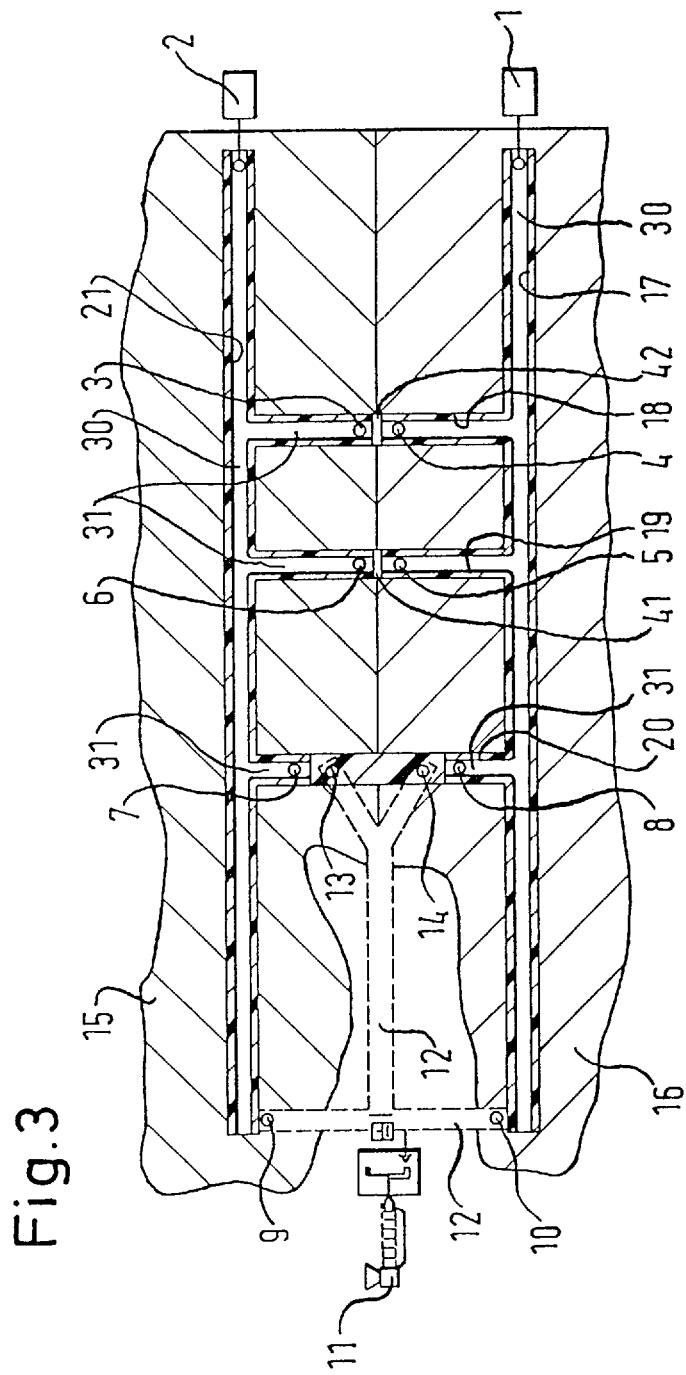

PROCESS OF AND AN APPARATUS FOR INJECTION MOLDING HOLLOW-BLOWN PLASTIC BODIES

BACKGROUND OF THE INVENTION

The invention relates to a process of and an apparatus for injection molding hollow-blown plastic bodies in which the known gas internal pressure technique is used.

With regard to the term gas internal pressure process (GIP process), a process is understood in which a gas, mostly nitrogen, is injected into a mold cavity filled with a plastic melt and the melt is displaced by the gas pressure of approximately 25 to 300 bar, forming a gas channel. In accordance with the publication "Spritzgießen mit Gasinnendruck" (injection molding with gas internal pressure), P. Eyerer, R. Martins, Stuttgart and E. Bürkle, Munich, in the journal "Kunststoffe" (Plastics), Carl Hansa Verlag, Munich 1993, one differentiates between a standard gas internal pressure process and a special gas internal pressure process.

In the case of the so-called standard gas internal pressure process, a partial filling of a cavity, that is to say a hollow space in a mold, with plastic melt initially takes place. A gas is introduced as the remaining filling. This means that the cavity is initially partially filled with a precisely defined amount of plastic melt. The volume required for this must be previously determined empirically in order, on the one hand, to prevent the flow front from being blown through by the gas and, on the other hand, to ensure an ideal gas blowing volume. Simultaneously or subsequently, the gas is introduced into the interior of the molded part (plastic core), it being supplied via a sprue and distribution system (comprising a machine nozzle) or with the aid of tool nozzles in the tool. The gas moves the melt out of the plastic core towards the end of the flow path until the rest of the cavity has been completely filled. At which point in time the gas can actually displace the plastic material in the interior of the molded part depends on the physical processes in the nozzle and the molded part.

After the displacement process, the gas pressure acts in the hollow space formed in the molded part as a so-called dwell pressure to compensate contraction until the molded part has cooled to the extent that it can be removed from the mold.

However, before removal from the mold, it is necessary to reduce the gas pressure in the molded part interior because the hollow body will otherwise burst upon opening the tool.

This can be done by suitably drawing in the gas and/or relieving the pressure into the surroundings.

In the special GIP process, in contrast to the standard gas internal pressure process, the cavity is completely filled with melt. The so-called mass back-pressing then takes place. Understood under the term mass back-pressing is the pushing back of the plastic core of the melt out of the part being molded and through the so-called displacement nozzles into the plastification unit of the injection molding machine with the aid of gas pressure. Depending on the molded part geometry, the mass dwell pressure acts to compensate contraction of the remaining thin wall thickness. The position of the screw of the plastification unit after the pushing back step is a measure for the length of the gas channel. After the melt has been pushed back and the displacement nozzles have been closed, the gas pressure is increased to compensate contraction and for intensive cooling between the surface of the molded part and the tool wall. Subsequently, similarly as in the standard gas internal pressure process, a drawing in of gas or a release of pressure must be carried out in order to be able to remove the molded part.

Until now, these gas internal pressure processes could only be used for simple molded part geometries. For complicated molded part geometries, it was necessary until now to introduce the material forced out upon displacement of the molten core in a mold cavity into one or more side cavities removable from the molded part and provided in the tool.

A process and an apparatus for injection molding fluid-filled plastic bodies in which the molten core is displaced into a side cavity is known from DE 39 13 109 C2. In this known process, the mold cavity is initially completely filled with plastic melt and, after the hardening of the plastic melt at the walls of the mold cavity has set in, the still molten core of the plastic body is displaced by means of a fluid into at least one side cavity arranged outside the mold cavity and connected in a removable manner with this.

In this known process, it is normally necessary to close the side cavity with a slider which is then opened, for example, pneumatically or hydraulically before the introduction of gas and displacement of the melt.

The technical problem forming the basis of the invention consists in providing a process and an apparatus in which none or at least fewer side cavities are required then before, also in the case of complicated molded part geometries with, for example, transverse connections.

SUMMARY OF THE INVENTION

This technical problem is solved by a process of injection molding hollow-blown plastic bodies in which a mold cavity formed by a tool and consisting of at least one main mold cavity and one side mold cavity is filled with a pressurized flowable plastic melt and, simultaneously or after the setting in of the hardening of the plastic melt at the walls of the mold cavity, a fluid under pressure is introduced into the main mold cavity and the flowable core of the plastic melt is forced out of this main mold cavity. Subsequently, a fluid under pressure is introduced into the side mold cavity by means of which the flowable core of the plastic melt is forced out of the side mold cavity into the main mold cavity where the material which is still capable of flowing is deposited on the already hardened walls of the main mold cavity.

The invention is based on the concept of forcing the molten core by means of a fluid out of a side mold cavity connected with the main mold cavity when a gas channel has already been created in the main mold cavity by means of the known gas internal pressure technique. On account of the inventive process, it is possible for the first time with such a side mold cavity to completely do without a side cavity or, in the case of complicated geometries, to at least significantly reduce the number of side cavities in that the material of the molten core of the side mold cavity is pressed into the previously created gas channel of the main mold cavity and deposited there. As a consequence of this inventive mode of operation, on the one hand, side cavities for the side mold cavities and the associated closure mechanisms become superfluous. On the other hand, a smaller and cheaper tool can be made. Additionally, for the first time, no subsequent operation is required on a molded part of complicated geometry which would otherwise be necessary by way of removal of the side cavity or its neck piece. Additionally, the amount of gas required can be reduced on account of the reduction in volume.

Advantageously, in a first process step, the inventive process can be operated either according to the standard gas internal pressure process or the special gas internal pressure process. This means that either during introduction of the pressurized flowable plastic melt, a pressurized fluid is simultaneously introduced into the main mold cavity, on account of which the flowable core in the main mold cavity is expelled into a removable side cavity, or the entire mold cavity is first completely filled with plastic melt before a pressurized fluid is introduced in the mold cavity, on account of which the molten core in the main mold cavity is forced into the plastifying unit of the injection molding machine.

In the inventive process, gases or liquids as fluids for driving out the molten core can be injected into the main or side mold cavity. In particular, it is advantageous to use nitrogen.

An inventive apparatus for carrying out the process is provided with a mold cavity which is formed by a tool and consists of at least one main mold cavity and one side mold cavity which are directly connected to each other. In this case, at least one nozzle is provided for introducing a pressurized flowable plastic melt into the mold cavity. Additionally, at least one further nozzle is required for introducing a pressurized fluid into the main mold cavity, as is a further nozzle for introducing a pressurized fluid into the side mold cavity after the molten core in the main mold cavity has been forced out.

Advantageously, at least one longitudinal main mold cavity and at least one side mold cavity extending away from and connected with the main mold cavity are formed in the multi-part tool. As a result, for the first time it is possible to produce central webs and complicated molded part geometries with the gas internal pressure technique either entirely without or at least only with a small number of removal side cavities.

For this purpose, a gas nozzle is advantageously provided in the side mold cavity at the end opposite the point of connection to the main mold cavity.

If the process is operated in a first process step according to the standard gas internal pressure process, then it is advantageous that there is a hot channel nozzle arranged at one end of the main mold cavity through which the pressurized flowable plastic melt can be introduced into the main mold cavity and, simultaneously or after this, a pressurized fluid can be injected.

If two or more operationally approximately parallel main mold cavities are connected with each other by means of a number of side mold cavities which are formed by the tool, and the side mold cavities are subdivided in the central region by partition walls, a gas nozzle being arranged on each side of the partition wall, the number of required side cavities can be reduced either to zero or at least significantly.

If the inventive process is operated in a first process step according to the special gas internal pressure process, then it is advantageous that a gas internal pressure nozzle is arranged at an end of the main mold cavity which lies opposite the end with the nozzle for introducing the plastic melt. This produces the result for the purpose of forcing out the molten core in the main mold cavity that the excess material is forced back into the plastifying unit of the injection molding machine and can be reused in the next injection step.

BRIEF DESCRIPTION OF THE DRAWINGS

For further explanation and better understanding, an exemplary embodiment of the invention is explained and described in more detail in the following with reference to the drawings, in which:

FIG. 1 shows a schematic sectional view through an injection molding machine and a tool during the filling of the tool with a flowable plastic melt, FIG. 2 shows a sectional view according to FIG. 1 after the setting in of the hardening of the surface of the plastic body and during the forcing of the molten core out of the main mold cavities back into the screw of the injection molding machine, and FIG. 3 shows a sectional view according to FIG. 1 during the forcing of the molten core out of the further side mold cavities into the previously created gas channels shown in FIG. 2.

DESCRIPTION

A section through a schematically illustrated injection molding machine 11 comprising a multi-part tool 15, 16 is shown in FIG. 1. The tool 15, 16 forms a mold cavity which consists of several partial mold cavities 17 to 21. In this exemplary embodiment, the mold cavity consists of two parallel and spaced longitudinal cavities 17, 21 which are connected to each other by means of three transverse partial mold cavities 18, 19, 20. A hot channel distributor 12 extends from the schematically illustrated injection molding machine 11 to the ends of the longitudinal cavities 17, 21 and to a partial mold cavity 20. Gas internal pressure nozzles 1, 2 are respectively arranged at the opposing ends of the longitudinal cavities 17, 21. Similarly, gas internal pressure nozzles 3 to 6 are arranged in a central region of two partial mold cavities 18 and 19 extending transversely to the longitudinal cavities 17, 21. Respectively two gas internal pressure nozzles 3, 4 and 5, 6 are associated with a partial mold cavity. In this exemplary embodiment, partition plates 41, 42 are additionally arranged in partial mold cavities 18, 19 which centrally subdivide the partial mold cavities 18, 19. In this case, the gas internal pressure nozzles 3, 4 and 5, 6 are respectively arranged on the opposite sides of the partition plates 41, 42. Further gas internal pressure nozzles 7, 8 are arranged in the third partial mold cavity 20.

Hot channel nozzles 9, 10 and 13, 14 are arranged at the end of the hot channel distributor 12.

In the process step shown in FIG. 1, a 100% filling of the longitudinal cavities 17, 21 and of the partial mold cavities 18, 19, 20 with a pressurized molten plastic melt from the injection molding machine 11 takes place through the hot channel distributor 12 and the hot channel nozzles 13 and 14. In a first process step, all mold cavities are filled to 100% with the flowable plastic melt.

As shown in FIG. 2, after the hardening of the surface of the plastic body formed in the first process step, in a second process step, an injection of a fluid through the gas internal pressure nozzles 1 and 2 into the longitudinal cavities 17 and 21 takes place, on account of which the molten core of the plastic material is forced out of the longitudinal cavities 17, 21 in the direction of the hot channel distributor 12. This operation continues until gas channels 30 extending through the entire length of the respective longitudinal mold cavities 17, 21 are produced. During this, the excess material of the plastic melt is forced back into the injection molding machine or into the plastifying unit of the injection molding machine 11.

In a third process step, as shown in FIG. 3, a pressurized fluid is introduced through the gas internal pressure nozzles 3 to 8 into the partial mold cavities 18, 19, 20 and the molten core is forced out of these partial mold cavities 18, 19, 20 into the longitudinal mold cavities 17 and 21 in the direction of the already produced gas channels 30. This operation again lasts until the partial mold cavities 18, 19, 20 are blown into the hollow state up to the gas channels 30 already produced in the longitudinal mold cavities 17, 21 and until gas channels 31 are produced in this manner. During this, the molten core from the partial mold cavities 18, 19, 20 is deposited onto the already hardened walls in the longitudinal mold cavities 17 and 21, respectively.

After the process of displacing the molten core out of the partial mold cavities 18, 19, 20, the gas pressure acts in the gas channels 30 and 31 and consequently in the entire mold cavity of the molded part as a dwell pressure to compensate contractions until the molded part has cooled to the extent that it can be removed. Before removal, however, it is necessary to reduce the gas pressure in the interior of the molded part because the hollow body will otherwise burst upon opening the tool. This can take place by suitably drawing in the gas and/or releasing the pressure into the surroundings. The pressure release or drawing in of the gas and the removal occurs in the manner according to the state of the art.

I claim:

1. A process of injection molding hollow-blown plastic bodies comprising:

providing a tool containing a mold cavity having at least one wall and comprising at least one main mold cavity and at least one side mold cavity;

completely filling the mold cavity with a flowable plastic melt;

commencing hardening of the plastic melt at the wall of the mold cavity to form hardened plastic melt at the wall of the mold cavity and leaving a core of plastic melt surrounded by the hardened plastic melt;

introducing a first pressurized fluid into the main mold cavity, the mold cavity having been previously completely filled with the flowable plastic melt, the first pressurized fluid effective for forcing the molten core of the plastic melt out of the main mold cavity to form at least one gas channel having at least one wall comprised of hardened plastic melt; and introducing a second pressurized fluid into the side mold cavity, the second pressurized fluid effective for forcing a side mold cavity molten core of the plastic melt out of the side mold cavity into the gas channel in the main mold cavity where the side mold cavity molten core of plastic melt, which is still capable of flowing, is deposited on the hardened walls of the gas channel formed in the main mold cavity.

2. A process according to claim 1, wherein a plastifying unit introduces the plastic melt into the mold cavity and wherein the molten core in the main mold cavity is forced back into the plastifying unit during introduction of the first pressurized fluid into the main mold cavity.

3. A process according to claim 1, wherein the molten core in the main mold cavity is forced into a removable side cavity during introduction of the first pressurized fluid into the main mold cavity.

4. A process according to claim 1, wherein the first and second pressurized fluid is nitrogen.

5. A process according to claim 3, wherein a plastifying unit introduces the plastic melt into the mold cavity and wherein the molten core is forced back into the plastifying unit during introduction of the first pressurized fluid into the main mold cavity.

6. A process according to claim 1, wherein the molten core in the main mold cavity is forced into a plastifying unit during the introduction of the first pressurized fluid into the main mold cavity.

7. A process according to claim 4, wherein the molten core in the main mold cavity is forced into a removable side cavity during introduction of the first pressurized fluid into the main mold cavity.

* * * * *